United States Patent

Miers et al.

[11] 3,949,975
[45] Apr. 13, 1976

[54] VIBRATION DAMPING MEANS FOR THE ROLL-OVER PROTECTION CANOPY OF A HEAVY VEHICLE

[75] Inventors: Bruce Walter Miers, Peoria Heights; James Lloyd Taylor, Washington, both of Ill.

[73] Assignee: Caterpillar Tractor Co., Peoria, Ill.

[22] Filed: Mar. 24, 1975

[21] Appl. No.: 561,136

[52] U.S. Cl. .............................................. 267/136
[51] Int. Cl.² ........................................... F16F 7/12
[58] Field of Search ........... 267/136, 137, 139, 140, 267/141, 152, 153, 63 A, 159

[56] References Cited
UNITED STATES PATENTS

| | | | |
|---|---|---|---|
| 3,330,515 | 7/1967 | Janssen et al. | 267/141 |
| 3,764,177 | 10/1973 | Woodward | 267/159 |

*Primary Examiner*—James B. Marbert
*Attorney, Agent, or Firm*—Wegner, Stellman, McCord, Wiles & Wood

[57] ABSTRACT

Vibration damping means for a mounting post of a roll-over protection canopy of a heavy vehicle such as a tractor, earth mover, or the like. A hollow square post has slightly concave walls and slides over an upright square mounting stub on the vehicle, to which it is secured by a bolt which impales the post and the stub. A reduced upper end portion of the stub receives a vibration damping member which is in the form of a hollow square. The member has rounded corners which fit snugly in the corners of the post, and the span across opposite faces of the member is less than the internal width of the post so as not to bind in the post.

4 Claims, 4 Drawing Figures

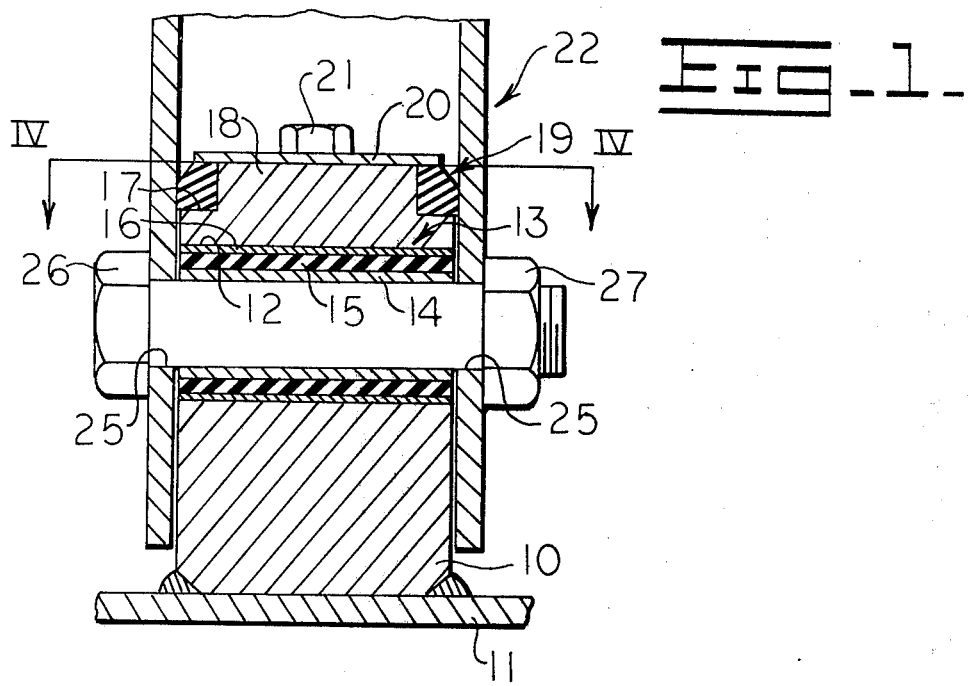
FIG_1_
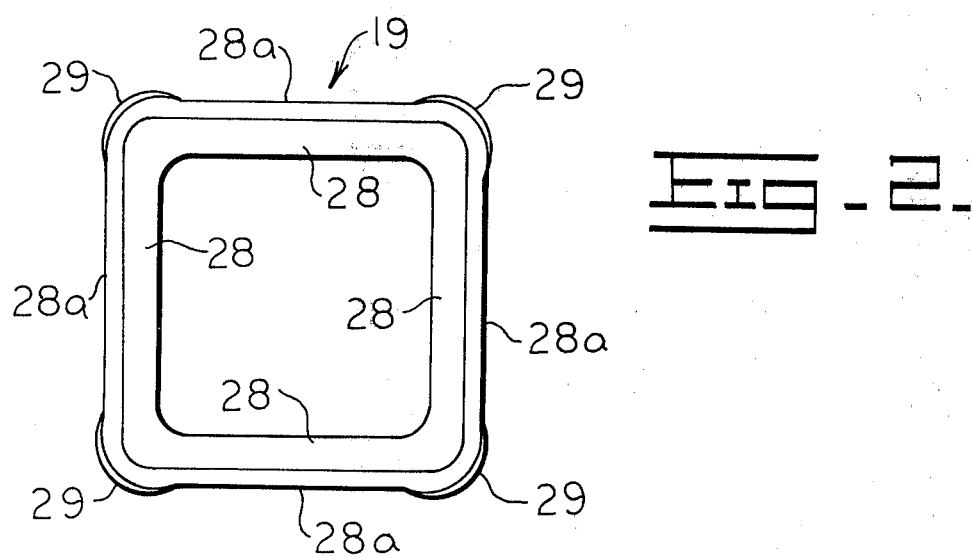
FIG_2_

VIBRATION DAMPING MEANS FOR THE ROLL-OVER PROTECTION CANOPY OF A HEAVY VEHICLE

BACKGROUND OF THE INVENTION

Heavy vehicles such as tractors, earth movers, and the like are provided with a roll-over protective structure which must be sturdy enough that it does not collapse in an ordinary overturning accident. Such structures ordinarily have four heavy corner posts which support a top frame and canopy above the operator's seat.

The extreme rigidity of hollow square posts makes them particularly desirable for use in such roll-over protection structures, and conveniently such posts have their lower end telescoped over upright, square mounting stubs on the vehicle and are secured to the stubs by bolts which impale the posts and the stubs.

The substantial motor vibration of such heavy vehicles is transmitted through the mounting stubs and the hollow posts into the canopy structure which vibrates and is excessively noisy unless vibration damping means is positioned within the posts. Heretofore such vibration damping means has taken the form of a hollow square member of elastomeric material which is seated upon a circumferential shoulder at the upper end of the stub and snugly surrounds an upper stub extremity which is of reduced cross-sectional area. The sides of the elastomeric member bear upon the inner surfaces of the walls of the hollow post so as to damp vibration which would otherwise be transmitted freely the length of the post.

Square posts which are formed from heavy gauge steel commonly have concave sides due to internal stresses produced during fabrication. A vibration damping member which is of such dimensions that it should fit comfortably within a particular post often binds so badly between the concave sides that the canopy posts must be forced upon the supporting stubs. This can produce damage to the damping member which hampers its effectiveness in suppressing vibration and noise, and which also may cause premature failure of the damping member.

SUMMARY OF THE INVENTION

In accordance with the present invention, a vibration damping member has rounded corners which fit snugly in the corners of a square post, and the span across opposite faces of the member is less than the internal width of the post so the damping member does not bind in the post and damage to it is avoided.

The principal object of the present invention, therefore, is to provide an improved vibration damping member for a mounting post of a roll-over protective device of a heavy vehicle.

Another object of the invention is to provide a vibration damping device which is less subject to damage during canopy installation than are those of the prior art.

THE DRAWINGS

FIG. 1 is a fragmentary vertical cross-sectional view of the structure for mounting one post of a roll-over protection canopy;

FIG. 2 is a plan view of the improved vibration damping member of the present invention;

DETAILED DESCRIPTION OF THE INVENTION

Figure 3:
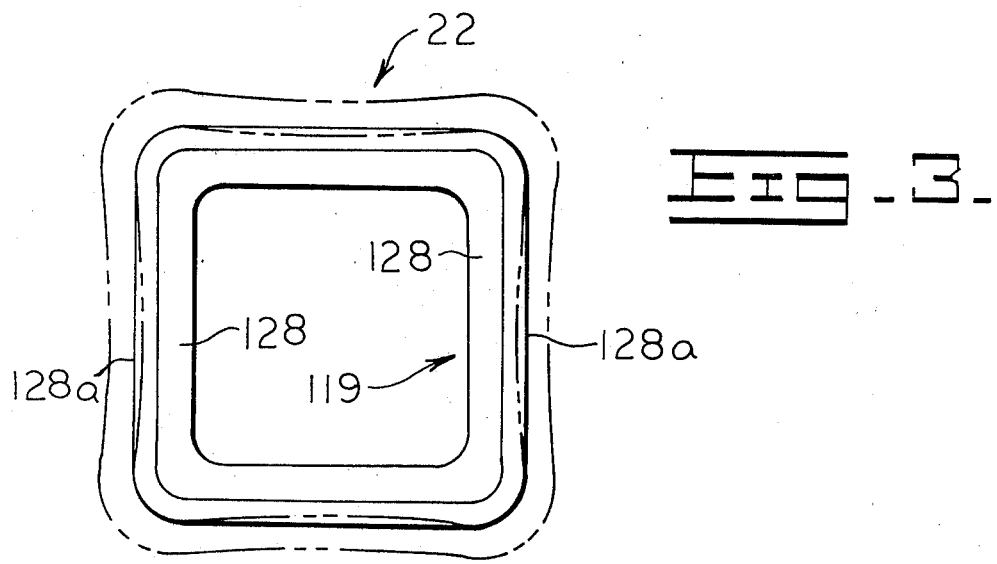
FIG. 3 is a plan view of a prior art vibration damping member with the post structure illustrated in broken lines.

Referring to the drawings, a square mounting stub 10 is rigidly secured to a vehicle 11 and has a transverse hole 12 in which a bushing assembly, indicated generally at 13, is mounted. The bushing assembly 13 includes an internal tube 14, a resilient sleeve 15, and an external shell 16. At the upper end of the mounting stub 10 is a peripheral shoulder 17 which defines an upper extremity 18 of reduced cross-sectional area.

An elastomeric damping member, indicated generally at 19, is best seen in FIG. 2 to be in the form of a hollow square which fits snugly over the extremity 18 of the stub and seats upon the shoulder 17. A plate 20 is secured to the upper extremity of the stub 10 by means of a screw 21, and the periphery of the plate 20 overlies the elastomeric member 19 to retain it firmly in place upon the shoulder 17.

Figure 4:
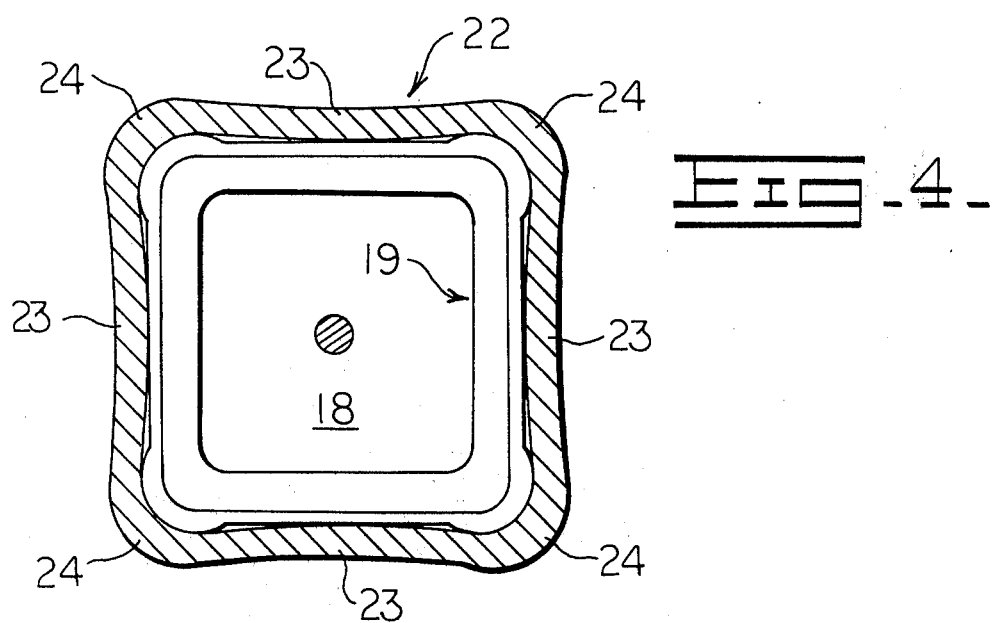
FIG. 4 is a transverse sectional view taken substantially as indicated along the line IV—IV of FIG. 1.

A tubular canopy post, indicated generally at 22, is seen in FIG. 4 to have four sides 23 which are slightly concave and rounded corners 24. The post 22 has holes 25 which are adapted to be aligned with the interior tube 14 in order that the post and the stub may be impaled by a bolt 26 which receives a nut 27 to secure the post to the stub.

As best seen in FIGS. 2 and 4, the elastomeric member 19 has sides 28 which correspond to the side 23 of the post, and corners 29 which fit in the corners 24 of the post. The span across the opposite faces 28a of two opposite sides 28 of the elastomeric member is slightly less than the internal width between opposite walls 23 of the post, so the sides 28 do not bind inside the post as the latter is mounted upon the stub. On the other hand, the rounded corners 29 of the elastomeric member fit snugly within the corners of the post. It has been found that a typical hollow square post used for a roll-over protection canopy functions properly with an elastomeric member in which the side faces 28a are relieved 0.045 inch—i.e., the span across opposite faces 28a is 0.09 inch less than the span across the widest part of two adjacent corners 29.

The firm abutting relationship between the corners 29 of the elastomeric member 19 and the corners 24 of the post maintains a small space between the post and the mounting stub 10 which extends completely around the stub.

The structure of the present invention is best compared with the prior art by reference to FIG. 3. A prior art elastomeric sound damping member 119 has side walls 128 which have straight outer faces 128a. A corner post 22 is shown in broken lines, superimposed upon the prior art vibration damping member 119 in order that the degree of interference between the concave sides of the post and the damping member may be seen. As previously stated, this interference is sufficient to cause difficulties in assembling the structure, and to reduce the effectiveness and useful life of the damping member.

The foregoing detailed description is given for clearness of understanding only and no unnecessary limitations should be understood therefrom, as modifications will be obvious to those skilled in the art.

We claim:

1. In means for mounting on a heavy vehicle such as a tractor a roll-over protection structure that includes an upright rectangular mounting stub on the vehicle and a hollow post that is substantially rectangular in cross section with slightly concave sides, said post sliding over the stub and being secured by a bolt which impales the stub and the post, improved vibration damping means comprising:

an elastomeric member of predetermined thickness at the upper end of the stub, said elastomeric member having a central opening bounded by four sides with a span across the outer faces of each two opposite sides which is slightly less than the internal width of the post so as not to bind within the post, and said elastomeric member having rounded external corners which project outwardly past the planes of the adjacent outer faces of the member so as to fit snugly in the corners of the post;

and means for securing the elastomeric member firmly to the stub, said securing means including an upper end portion of reduced cross sectional area surmounting the stub and impaling the central opening in the elastomeric member, the height of said upper end portion being not significantly less than the thickness of said member, a retaining plate which overlies the upper end portion and the elastomeric member, and a fastener impaling the plate and detachably engaging the top of the upper end portion.

2. The damping means of claim 1 in which the span across the outer faces of two opposite sides is substantially 0.09 inch less than the span across the member at adjacent corners.

3. The damping means of claim 1 in which the central opening in the elastomeric member and the upper end portion of the stub are both non-circular so as to position the external corners of said member at the corners of the mounting stub.

4. The damping means of claim 3 in which said central opening and said upper end portion are both rectangular.

* * * * *